United States Patent [19]
Abe et al.

[11] Patent Number: 5,213,781
[45] Date of Patent: May 25, 1993

[54] METHOD OF CLEANING NITROGEN OXIDE CONTAINING EXHAUST GAS

[75] Inventors: Akira Abe; Satoshi Sumiya; Yoshikazu Takahashi; Kiyohide Yoshida; Gyo Muramatsu, all of Kumagaya, Japan

[73] Assignee: Kabushiki Kaisha Riken, Japan

[21] Appl. No.: 773,113

[22] Filed: Oct. 8, 1991

[30] Foreign Application Priority Data

Oct. 8, 1990 [JP] Japan ................................ 2-270200
Oct. 8, 1990 [JP] Japan ................................ 2-270201

[51] Int. Cl.$^5$ ............................ B01J 8/00; B01J 8/02; C01B 21/00
[52] U.S. Cl. .................................. 423/239; 423/213.2
[58] Field of Search ................. 423/239, 239 A, 213.2

[56] References Cited

U.S. PATENT DOCUMENTS

| | | | |
|---|---|---|---|
| 3,857,921 | 12/1974 | Tamura et al. | 423/239 |
| 3,896,048 | 7/1975 | Mehalchick et al. | 252/455 R |
| 4,814,153 | 3/1989 | Kobayashi et al. | 423/213.2 |

FOREIGN PATENT DOCUMENTS

| | | |
|---|---|---|
| 0092023A1 | 10/1983 | European Pat. Off. |
| 49-49866 | 5/1974 | Japan ................ 423/239 |
| WO90126-46A1 | 11/1990 | World Int. Prop. O. |

Primary Examiner—Gregory A. Heller
Attorney, Agent, or Firm—Brumbaugh, Graves, Donohue & Raymond

[57] ABSTRACT

An exhaust gas cleaner comprising a heat-resistant, porous filter, a porous ceramic layer formed on the filter, and a catalyst supported by the ceramic layer, the catalyst consisting essentially of:
(a) at least one of alkali metal elements;
(b) copper and vanadium; and
(c) at least one of rare earth elements.

By using this exhaust gas cleaner, particulate matter in the exhaust gas is oxidized by the catalyst supported by the filter, and nitrogen oxides are reduced by the particulate matter serving as a reducing agent.

4 Claims, No Drawings

METHOD OF CLEANING NITROGEN OXIDE CONTAINING EXHAUST GAS

BACKGROUND OF THE INVENTION

The present invention relates to an exhaust gas cleaner and a method of cleaning an exhaust gas by using such an exhaust gas cleaner, and more particularly to an exhaust gas cleaner capable of efficiently removing nitrogen oxides and fine carbonaceous particles simultaneously from exhaust gases of diesel engines, etc., and a method of cleaning an exhaust gas by using such an exhaust gas cleaner.

Recently, fine carbonaceous particles (hereinafter referred to simply as "particulate matter") and nitrogen oxides (hereinafter referred to simply as "NOx") contained in exhaust gases of diesel engines, etc. are causing environmental problems. In particular, the particulate matter having an average particle size of 0.1–1 $\mu$m is likely to float in the air and be inhaled by breathing. As a result of recent clinical tests, it is confirmed that the particulate matter contains carcinogenic substances.

As a method for removing the particulate matter, there are two candidates:

One method comprises the steps of trapping the particulate matter in heat-resistant filters by filtrating exhaust gases, and burning the trapped particulate matter by a burner, an electrical heater, etc. when a pressure loss increases due to the particulate matter accumulated, to regenerate filters. The heat resistant filters may be a honeycomb-type ceramic filter, a foam-type ceramic filter having a three-dimensional network structure, steel wool, wiremesh, etc. The other method comprises the step of trapping and self-burning the particulate matter by the action of catalysts supported by the above filters.

In the former method, as the efficiency for removing the particulate matter increases, the pressure loss increases more quickly, meaning that the filters are required to be regenerated more frequently with a high reliability, leading to an economical disadvantage.

In contrast, the latter method is considered to be excellent as long as a catalyst exists, which is capable of maintaining a catalytic activity under the conditions of the exhaust gases of diesel engines with which the catalyst is brought into contact (gas composition, gas temperature, etc).

However, since a diesel oil is used as a fuel in diesel engines, exhaust gases contain a large amount of $SO_2$. The oxygen concentration in exhaust gases varies in a wide range of 2–20%, depending upon the operation conditions of diesel engines. Under these conditions, there has been no established method of well igniting and burning fine carbon particles accumulated without causing secondary pollution.

For instance, as catalysts for removing particulate matter from exhaust gases, which have been proposed so far, there are precious metal catalysts and base metal catalysts. The precious metal catalysts are durable and function efficiently to oxidize CO and unburned hydrocarbons (hereinafter referred to simply as "HC"), but it is likely to convert $SO_2$ existing in exhaust gases to $SO_3$, leading to secondary pollution. Besides, there are problems such that ignition activity of soot in the particulate matter is lowered. On the other hand, base metal catalysts are effective for removing the particulate matter, but its durability is poor.

Most of the catalysts for exhaust gas cleaners, which have been proposed hitherto, mainly function to lower the ignition temperature of particulate matter, leaving unsolved the problems of removing NOx from exhaust gases of diesel engines having a large oxygen concentration and/or a considerably variable oxygen concentration.

OBJECT AND SUMMARY OF THE INVENTION

Accordingly, an object of the present invention is to provide an exhaust gas cleaner capable of efficiently removing not only particulate matter but also nitrogen oxides from the exhaust gas having a considerably variable oxygen concentration.

Another object of the present invention is to provide a method of cleaning an exhaust gas by using the above exhaust gas cleaner.

As a result of intense research in view of the above objects, the inventors have found that by using an exhaust gas cleaner comprising a heat-resistant, porous filter with a porous ceramic layer which carries a catalyst consisting essentially of at least one alkali metal element, particular transition elements (Cu and V) and at least one rare earth metal element, the particulate matter and the nitrogen oxides can be efficiently removed simultaneously from the exhaust gas having a considerably variable oxygen concentration, and the cleaning-efficiency of the exhaust gas cleaner can be kept high for a long period of time. The present invention is based on these findings.

Thus, the exhaust gas cleaner according to one embodiment of the present invention comprises a heat-resistant, porous filter, a porous ceramic layer formed on the filter, and a catalyst supported by the ceramic layer, the catalyst consisting essentially of:
(a) at least one alkali metal elements;
(b) a Cu element and a V element; and
(c) at least one of rare earth elements.

The exhaust gas cleaner according to another embodiment of the present invention comprises a heat-resistant, porous filter and a catalytic layer formed on the filter, the catalytic layer being a uniform mixture of a catalyst and a ceramic carrier powder, the catalyst consisting essentially of:
(a) at least one of alkali metal elements;
(b) a Cu element and a V element; and
(c) at least one of rare earth elements,
wherein the amount of said catalyst is 1–20 parts by weight and the amount of said ceramic carrier powder is 1–10 parts by weight, based on 100 parts by weight of said filter.

The method of cleaning an exhaust gas according to the present invention comprises using the above exhaust gas cleaner, whereby particulate matter in the exhaust gas is oxidized by the catalyst supported by the filter, and nitrogen oxides are reduced by the particulate matter serving as a reducing agent.

DETAILED DESCRIPTION OF THE INVENTION

Since the heat-resistant, porous filter according to the present invention is exposed to a high-temperature exhaust gas, it is required to have an excellent heat resistance, and particularly an excellent thermal shock resistance. It is also required to have a necessary particulate matter-capturing capacity while causing pressure loss only within the permitted range. Such materials for the heat-resistant, porous filter include ceramics such as alumina, silica, titania, zirconia and their composites such as silica-alumina, alumina-zirconia, alumina-titania, silica-titania, silica-zirconia, titania-zirconia, mullite, cordierite, etc.

The filter preferably has a porosity of 40–80%.

The shape and the size of the filter may vary depending upon its purpose, but in general, it is preferably of a cylindrical type, and preferably has a diameter of 30–400 mm and a length of 5–30 mm. If necessary, a plurality of filters may be laminated.

The catalyst supported by the above filter consists essentially of (a) at least one of alkali metal elements (Li, Na, K, Cs, etc.); (b) Cu and V; and (c) at least one of rare earth elements (Ce, La, Nd, Sm, etc.).

By using the catalyst consisting essentially of the above components, the particulate matter in the exhaust gas can be ignited and burned at a relatively low temperature, and NOx can be efficiently removed. Specifically, when the particulate matter in the exhaust gas is brought into contact with the above catalyst in the presence of oxygen, the ignition temperature of the particulate matter is lowered. As a result, the particulate matter is burned (oxidized) at 400° C. or lower. At the same time, NOx is reduced to $N_2$ by the particulate matter serving as a reducing agent, whereby the exhaust gas can efficiently be cleaned. The reason why the reduction of the NOx can efficiently be carried out at a relatively low temperature is that the components (a), (b) and (c) in the catalyst show synergistic effects.

A catalyst comprising an alkali metal element, a transition metal (particularly, Cu), and a rare earth metal is effective to some extent to simultaneously remove NOx and the particular matter in the initial stage of the operation. However, if only a combination of the above three elements (an alkali metal element, Cu as a transition metal, and a rare earth metal) is used, the catalytic activity would be gradually lowered by the presence of sulfur and sulfur oxides in the exhaust gas. Particularly, when the exhaust gas is at a high temperature, sulfur oxides such as $SO_2$ rapidly lower the catalytic activity of the catalyst. Accordingly, in the present invention, both of Cu and V are used as the transition metal components (b).

By using a combination of an alkali metal, Cu and V, and a rare earth metal, it is possible to stably carry out the simultaneous removal of NOx and the particulate matter for a long period of time, although the initial activity of the catalyst is not remarkably improved.

The alkali metal element (a) is preferably at least one of lithium, sodium, potassium and cesium. The transition metal elements (b) are Cu and V. The rare earth metal element (c) is preferably at least one of cerium, lanthanum and neodymium.

The amounts of the three components (a), (b) and (c), respectively, expressed in weight ratios of metal elements themselves, are (a) 10–50 parts by weight, (b) 30–80 parts by weight, and (c) 10–50 parts by weight, and preferably (a) 25–50 parts by weight, (b) 50–80 parts by weight, and (c) 25–50 parts by weight. The weight ratio of Cu and V in the component (b) is preferably 5/1–1/15.

According to one embodiment of the present invention, the catalyst is supported by the above heat-resistant, porous filter via a more porous ceramic carrier layer formed on the porous filter.

The carrier layer may be made of a porous ceramic material having a large surface area such as titania, alumina, silica, titania-alumina, titania-silica. In the case of using the ceramic filter, the amount of the ceramic carrier material applied to the filter may be 3–15 weight %, preferably 5–12 weight % based on the filter. The amount of the catalyst may be 1–40 weight %, preferably 5–30 weight % based on the ceramic carrier material.

The ceramic carrier layer is formed on the filter by a wash-coating method, a sol-gel method, etc.

In the wash-coating method, the filter is immersed in a slurry of the above porous ceramic carrier material and dried so that a carrier layer is formed on the filter.

The sol-gel method comprises hydrolyzing organic salts (for instance, alkoxides) of the ceramic carrier-constituting metals; applying the resulting sol to the filter; bringing the coated filter into contact with water vapor, etc. to form a layer composed of colloidal particles; and drying and burning it to convert it to a carrier layer for the catalyst. For instance, when catalytic metals are to be supported by a titania ($TiO_2$) carrier layer, a solution of Ti alkoxide (for instance, $Ti(O-iso\ C_3H_7)_4$) in alcohol is mixed with an acid such as $CH_3COOH$, $HNO_3$, HCl, etc. to prepare a coating solution, and the filter is immersed in the coating solution. After removing the filter from the coating solution, it is reacted with vapor or water to cause gelation. After drying and burning, a thin titania coating is formed on a porous surface of the filter. In the sol-gel method, the acid serves as a hydrolysis catalyst in the course of gelation. However, alkalis may be added in place of the acids to conduct the hydrolysis reaction.

According to another embodiment of the present invention, the above catalyst is uniformly mixed with the ceramic carrier powder to prepare a uniform mixture of the above catalyst and ceramic power, and the mixture is applied to the heat-resistant, porous filter as a catalytic layer. This catalytic layer can be formed by a wash-coating method, a sol-gel method, etc. By using such a method, the resulting catalytic layer is highly porous, having a large contact area with the exhaust gas.

The ceramic carrier powder may be made of a porous ceramic material having a large surface area such as titania, alumina, silica, titania-alumina, titania-silica, etc.

The amount of the catalyst applied to the filter may be 1–20 parts by weight based on 100 parts by weight of the filter. When the amount of the catalyst is less than 1 part by weight, it is difficult to simultaneously remove the particulate matter and NOx. On the other hand, even though the amount of the catalyst exceeds 20 parts by weight, a catalytic activity would level off. Accordingly, the upper limit should be 20 parts by weight. The preferred amount of the catalyst is 5–15 parts by weight.

The amount of the ceramic carrier powder may be 1–10 parts by weight based on 100 parts by weight of the filter. When the amount of ceramic carrier powder is less than 1 parts by weight, a ceramic carrier cannot support a sufficient amount of the catalyst. On the other hand, when the amount of the ceramic powder exceeds 10 parts by weight, the pressure loss in the exhaust gas cleaner becomes too high. The preferred amount of ceramic powder is 2–6 parts by weight.

In the wash-coating method, the above filter is immersed in a slurry comprising the catalytic components and the ceramic powder such as titania to form a catalytic carrier layer (a porous ceramic layer) on the filter.

With respect to the sol-gel method in the second embodiment, the ceramic carrier materials and the catalytic components are simultaneously applied to the ceramic filter. For instance, a solution of Ti alkoxide in alcohol is mixed with an acid such as $CH_3COOH$, $HNO_3$, HCl, etc. and an aqueous solution of catalytic component metal salts to prepare a coating solution, and the ceramic body is immersed in the coating solution. After removing the ceramic body from the coating solution, it is reacted with vapor or water to prepare a sol, which is then converted to a gel. The gel is dried and then burned to provide a catalyst-supporting ceramic carrier.

By using this sol-gel method, the catalyst can be extremely uniformly dispersed in the ceramic filter, leading to an increase in catalytic activity.

The catalytic metal salts used in this sol-gel method may be of any type, as long as they are soluble in water, including carbonates, nitrates, acetates, hydroxides, etc. In addition, for the purpose of uniformly dispersing catalyst metal salts in an alkoxide solution in alcohol, a dispersing agent such as ethylene glycol, etc. is preferably added.

Although the above explanation has been made with respect to the case of using titania as a ceramic carrier material, any other ceramics may be similarly used to support the catalyst by the sol-gel method. For instance, in the case of supporting the catalytic components by alumina, the same methods as above may be used except for using alkoxides of Al. Other porous carriers may be used in the same manner as above.

After forming a porous ceramic carrier layer on the filter, by the above wash-coating method or the sol-gel method, etc., the carrier layer-coated filter is immersed in aqueous solutions of carbonates, nitrates, acetates, hydroxides, etc., of catalytic components, dried and then burned to obtain the filter supporting the catalyst via the ceramic layer. The catalytic metal salts may be of any type, as long as they are soluble in water, including carbonates, nitrates, acetates, hydroxides, etc. With respect to V, a solution of $NH_4VO_3$ and oxalic acid may be used. Alkali metals and V may simultaneously be applied by using a solution of alkali vanadate.

In the case of the exhaust gas cleaner having, on the surface, a catalytic layer comprising a uniform mixture of a catalyst and porous ceramic powder, a relatively large amount of the catalyst can be carried even when the amount of the ceramic carrier powder is small, thereby lowering a pressure loss. This means that a large amount of the catalyst can be applied to the filter, even in the case of using ceramic powder in an amount small enough to prevent a high pressure loss.

Incidentally, in the above explanation, catalyst components are expressed as metal elements. However, the base metal catalysts usually exist in the form of oxides. K, for instance, is actually in the form of $K_2O$. Accordingly, please note that the base metal catalysts may be in the form of oxides.

The present invention will be described in further detail by way of the following Examples. In each Example and Comparative Example, catalytic components are described simply by metal elements for simplicity.

EXAMPLE 1

A ceramic foam-type filter made of cordierite (apparent volume: 2 l, density: 0.65 g/ml) was coated with $TiO_2$ powder in an amount of 10 weight % based on the filter, by a wash-coating method.

The coated filter was impregnated with 2.5 weight % of Cu by using an aqueous solution of $CuCl_2$, 2.5 weight % of La by using an aqueous solution of $La(NO_3)_3$, and 2.5 weight % of Cs by using an aqueous solution of $CsNO_3$, each based on $TiO_2$. After drying the impregnated filter, it was burned at 700° C. Next, the burned filter was impregnated with 2.5 weight % of V by using an aqueous solution of $NH_4VO_3$ and oxalic acid. After drying the impregnated filter, it was burned again at 700° C. for 3 hours to produce an exhaust gas cleaner.

With respect to this exhaust gas cleaner, a regeneration temperature of the filter (expressed by a temperature at which pressure loss started to decrease by burning particulate matter) and a conversion rate of NOx to $N_2$ at the regeneration temperature were measured by using a diesel engine having a displacement of 510 cc. The regeneration temperature and the conversion rate of NOx to $N_2$ were evaluated at two points, i.e., at a time when decrease in pressure loss was observed for the first time in an initial stage of the operation, and at a time when decrease in pressure loss was observed after the lapse of 10 hours from the initiation of the operation. The diesel engine was operated at 1500 rpm under a load of 90%. Under these conditions, the exhaust gas comprised 90 ppm of HC (total of hydrocarbons), 460 ppm of CO, 480 ppm of NOx, 10% of $O_2$ and 200 ppm of $SO_2$. The results are shown in Table 1.

EXAMPLE 2

In the same manner as in Example 1, a ceramic foam-type filter made of cordierite (apparent volume: 2 l, density: 0.65 g/ml) was coated with $TiO_2$ in an amount of 10 weight % based on the filter. The coated filter was impregnated with 2.5 weight % of Cu, 2.5 weight % of Ce, and 2.5 weight % of Cs, each based on the $TiO_2$ carrier layer, by using aqueous solutions of $CuCl_2$, $Ce(NO_3)_3$ and $CsNO_3$, respectively. The impregnated filter was dried and burned in the same manner as in Example 1. Next, the burned filter was impregnated with 2.5 weight % of V in the same manner as in Example 1 to produce an exhaust gas cleaner which supported a catalyst composed of Cu, Cs, Ce and V.

With respect to the exhaust gas cleaner, a regeneration temperature and a conversion rate of NOx to $N_2$ were measured in the same manner as in Example 1. The results are shown in Table 1.

EXAMPLE 3

In the same manner as in Example 2, an exhaust gas cleaner supporting 2.5 weight % of Cu, 2.5 weight % of La, 2.5 weight % of K and 2.5 weight % of V, each based on $TiO_2$ carrier layer, was produced by using aqueous solutions of $CuCl_2$, $La(NO_3)_3$, KCl and $NH_4VO_3$, respectively.

With respect to the exhaust gas cleaner, a regeneration temperature and a conversion rate of NOx to $N_2$ were measured in the same manner as in Example 1. The results are shown in Table 1.

EXAMPLE 4

In the same manner as in Example 2, an exhaust gas cleaner supporting 2.5 weight % of Cu, 2.5 weight % of Ce, 2.5 weight % of K and 2.5 weight % of V, each based on the $TiO_2$ carrier layer, was produced by using aqueous solutions of $CuCl_2$, $Ce(NO_3)_3$, KCl and $NH_4VO_3$, respectively.

With respect to the exhaust gas cleaner, a regeneration temperature and a conversion rate of NOx to $N_2$ were measured in the same manner as in Example 1. The results are shown in Table 1.

COMPARATIVE EXAMPLES 1–4

In the same manner as in Example 1, each of four ceramic foam-type filters made of cordierite (apparent volume: 2 l, density: 0.65 g/ml) was coated with $TiO_2$ in an amount of 10 weight % based on the filter, by using a wash-coating method.

Each coated filter was immersed in such a combination of aqueous solutions of $La(NO_3)_3$, $Ce(NO_3)_3$, $CuCl_2$, $CsNO_3$ and KCl as to produce an exhaust gas cleaner supporting the following catalytic metals each in an amount of 2.5 weight %, dried and burned in the same manner as in Example 1.

| (Cs/Cu/La: | Comparative Example 1) |
|---|---|
| (Cs/Cu/Ce: | Comparative Example 2) |
| (K/Cu/La: | Comparative Example 3) |
| (K/Cu/Ce: | Comparative Example 4) |

With respect to each of these exhaust gas cleaners, a regeneration temperature and a conversion rate of NOx to $N_2$ were measured in the same manner as in Example 1. The results are shown in Table 1.

TABLE 1

| No. | Initial Stage[1] Regeneration Temp. (°C.) | Initial Stage[1] Conversion Rate of NOx to $N_2$[3] (%) | After 10 Hours[2] Regeneration Temp. (°C.) | After 10 Hours[2] Conversion Rate of NOx to $N_2$[3] (%) |
|---|---|---|---|---|
| Example 1 | 380 | 18 | 382 | 17 |
| Example 2 | 385 | 16 | 385 | 15 |
| Example 3 | 400 | 14 | 403 | 13 |
| Example 4 | 400 | 14 | 405 | 13 |
| Comparative Example 1 | 320 | 30 | 420 | 10 |
| Comparative Example 2 | 340 | 25 | 425 | 10 |
| Comparative Example 3 | 350 | 20 | 430 | 8 |
| Comparative Example 4 | 350 | 20 | 440 | 8 |

Note
[1] Measured at a time when decrease in pressure loss was first appreciated.
[2] Measured at a time when decrease in pressure loss was first appreciated after 10 hours from the initiation of passing exhaust gas through the filter.
[3] Calculated from the amount (Xa) of NOx in exhaust gas before entering into the filter, and the amount of (Xb) of NOx in exhaust gas after passage through the filter, by using the formula: (Xa − Xb)/Xa.

As is clear from Table 1, the exhaust gas cleaners of Examples 1–4 show high conversion rates of NOx to $N_2$ than those of Comparative Examples 1–4, when 10 hours passed after the operation had started. Also, the regeneration temperature of the filter at which particulate matter is ignited and burned is lower in Examples than in Comparative Examples, meaning that exhaust gas is efficiently cleaned in the present invention.

EXAMPLE 5

Acetic acid was added to a solution of Ti alkoxide ($Ti(O\text{-iso }C_3H_7)_4$) in alcohol. Added to the solution were a solution of $CuCl_2$, a solution of $La(NO_3)_3$, a solution of $CsNO_3$, and an aqueous solution of $NH_4VO_3$ and oxalic acid to prepare a coating solution.

A ceramic foam-type filter made of cordierite (apparent volume: 0.25 l, density: 0.65 g/ml) was immersed in the above coating solution. The impregnated filter was exposed to water vapor to convert the coating solution to a sol which was then converted to a gel. After drying the gel, it was burned at 600° C. for 3 hours to produce a foam-type filter having a ceramic layer with a catalyst ($TiO_2$: Cs/Cu/V/La). The amount of $TiO_2$ carried by the filter was 3 weight % based on the filter. The amounts of Cu, La, Cs and V were 1.5 weight % each, based on the filter.

Four of the filters were laminated to produce an exhaust gas cleaner having an apparent volume of 1 l.

With respect to this exhaust gas cleaner, pressure loss, a regeneration temperature of the filter (expressed by a temperature at which pressure loss started to decrease by burning particulate matter), and a conversion rate of NOx to $N_2$ at the regeneration temperature were measured by using a diesel engine having a displacement of 510 cc. The regeneration temperature and the conversion rate of NOx to $N_2$ were evaluated at two points, i.e., at a time when decrease in pressure loss was observed for the first time in an initial stage of the operation, and at a time when decrease in pressure loss was observed after the lapse of 10 hours from the initiation of the operation. The diesel engine was operated at 1500 rpm under a load of 90%. Under these conditions, the exhaust gas comprised 90 ppm of HC (total of hydrocarbons), 460 ppm of CO, 480 ppm of NOx, 10% of $O_2$ and 200 ppm of $SO_2$. The results are shown in Table 2.

EXAMPLE 6

In the same manner as in Example 5, a filter having a catalytic layer having catalytic metals and ceramic powder ($TiO_2$: Cs/Cu/V/Ce) was produced except for using $Ce(NO_3)_3$ in place of $La(NO_3)_3$.

The amount of $TiO_2$ carried by the filter was 4 weight % based on the filter. The amounts of Cs, Cu, V and Ce were 1.5 weight % each, based on the filter.

In the same manner as in Example 5, four of the filters were laminated to produce a gas exhaust cleaner.

With respect to the exhaust gas cleaner, the pressure loss, the regeneration temperature and the conversion rate of NOx to $N_2$ were measured in the same manner as in Example 5. The results are shown in Table 2.

EXAMPLE 7

A aqueous slurry comprising potassium titanate, $La(NO_3)_3$, $Cu(NO_3)_2$, $NH_4VO_3$ and oxalic acid was prepared.

The same filter as in Example 5 was immersed in the slurry. After removing and drying the immersed filter, it was burned at 700° C. for 3 hours to produce a foam-type filter having a ceramic layer with a catalyst ($TiO_2$: K/Cu/V/La).

The amount of $TiO_2$ carried by the filter was 3 weight % based on the filter. The amount of K was 3 weight %, and the amounts of Cu, La and V were 2 weight % each, based on the filter.

In the same manner as in Example 1, four of the filters were laminated to produce a gas exhaust cleaner.

With respect to the exhaust gas cleaner, the pressure loss, the regeneration temperature and the conversion rate of NOx to $N_2$ were measured in the same manner as in Example 5. The results are shown in Table 2.

EXAMPLE 8

In the same manner as in Example 5, a filter having a catalytic layer having catalytic metals and ceramic powder ($TiO_2$: K/Cu/V/Ce) was produced except for using $Ce(NO_3)_3$ in place of $La(NO_3)_3$.

The amount of $TiO_2$ carried by the filter was 3 weight % based on the filter. The amount of K was 3 weight %, and the amounts of Cu, Ce and V were 2 weight % each, based on the filter.

In the same manner as in Example 5, four of the filters were laminated to produce a gas exhaust cleaner.

With respect to the exhaust gas cleaner, the pressure loss, the regeneration temperature and the conversion rate of NOx to $N_2$ were measured in the same manner as in Example 5. The results are shown in Table 2.

COMPARATIVE EXAMPLES 5-6

Each of the same foam-type cordierite filters as in Example 5 was coated with a $TiO_2$ layer carrying the following catalytic metals in the same manner as in Example 6.

| Cs/Cu/La: | Comparative Example 5 |
|---|---|
| Cs/Cu/Ce: | Comparative Example 6 |

The amount of $TiO_2$ carried by the filter was 10 weight 5 based on the filter. The amount of each metal was 2.5 weight % based on the filter.

In the same manner as in Example 5, four of the filters were laminated to produce a gas exhaust cleaner.

With respect to each of these exhaust gas cleaners, the pressure loss, the regeneration temperature and the conversion rate of NOx to $N_2$ were measured in the same manner as in Example 5. The results are shown in Table 2.

COMPARATIVE EXAMPLES 7-8

Each of the same foam-type cordierite filters as in Example 5 was coated with a $TiO_2$ layer carrying the following catalytic metals in the same manner as in Example 5.

| K/Cu/La: | Comparative Example 7 |
|---|---|
| K/Cu/Ce: | Comparative Example 8 |

The amount of $TiO_2$ carried by the filter was 10 weight % based on the filter. The amount of each metal was 2.5 weight % based on the filter.

With respect to each of these exhaust gas cleaners, the pressure loss, the regeneration temperature and the conversion rate of NOx to $N_2$ were measured in the same manner as in Example 5. The results are shown in Table 2.

As is clear from Table 2, the exhaust gas cleaners of Examples 5-8 show low pressure losses and high conversion rates of NOx to $N_2$ than those of Comparative Examples 5-8, when 10 hours passed after the operation had started. Also, the regeneration temperature of the filter at which particulate matter is ignited and burned is lower in Examples than in Comparative Examples, meaning that exhaust gas is efficiently cleaned in the present invention.

As described above in detail, by using the exhaust gas cleaner according to the present invention, both particulate matter and NOx can efficiently be removed from the exhaust gas. Such exhaust gas cleaners are effective for cleaning exhaust gases even at a low temperature, such as those of diesel engines.

In the present invention, since the catalyst is supported by the porous ceramic carrier layer formed on the filter by the wash-coating method, the sol-gel method, etc., the catalyst can be uniformly supported on the filter in a high concentration, leading to a good catalytic activity.

In the first embodiment of present invention, NOx and particulate matter can be efficiently removed simultaneously from the exhaust gas having a high $SO_2$ concentration for a long period of time, without suffering from a decrease in catalytic activity.

In the second embodiment of the present invention, NOx and particulate matter can be efficiently removed simultaneously from the exhaust gas having a high $SO_2$ concentration for a long period of time, without suffering from pressure loss and a decrease in catalytic activity.

The exhaust cleaner and the exhaust gas-cleaning method according to the present invention are highly useful for cleaning the exhaust gas of diesel engines, etc.

What is claimed is:

1. A method of cleaning an exhaust gas containing nitrogen oxides and particulate matter by using an exhaust gas cleaner comprising a heat-resistant, porous filter, a porous ceramic layer formed on said filter, and a catalyst supported by said ceramic layer, said catalyst consisting essentially of:

(a) 10 to 50 parts by weight of at least one alkali metal element;

TABLE 2

| No. | Initial Stage[1] | | | After 10 Hours[2] | |
|---|---|---|---|---|---|
| | Pressure Loss (mmHg) | Regeneration Temp. (°C.) | Conversion Rate of NOx to $N_2$[3] (%) | Regeneration Temp. (°C.) | Conversion Rate of NOx to $N_2$[3] (%) |
| Example 1 | 55 | 380 | 18 | 382 | 17 |
| Example 2 | 72 | 385 | 15 | 385 | 15 |
| Example 3 | 70 | 400 | 14 | 403 | 13 |
| Example 4 | 73 | 400 | 14 | 405 | 13 |
| Comparative Example 1 | 100 | 380 | 20 | 425 | 10 |
| Comparative Example 2 | 105 | 390 | 18 | 430 | 10 |
| Comparative Example 3 | 103 | 405 | 15 | 440 | 8 |
| Comparative Example 4 | 99 | 405 | 15 | 450 | 8 |

Note
[1]Measured at a time when decrease in pressure loss was first appreciated.
[2]Measured at a time when decrease in pressure loss was first appreciated after 10 hours from the initiation of passing exhaust gas through the filter.
[3]Calculated from the amount (Xa) of NOx in exhaust gas before entering into the filter, and the amount of (Xb) of NOx in exhaust gas after passage through the filter, by using the formula: (Xa − Xb)/Xa.

(b) 30 to 80 parts by weight of copper and vanadium wherein the ratio of copper to vanadium is 5:1 to 1:15; and (c) 10 to 50 parts by weight of at least one rare earth element, wherein said particulate matter is oxidized by said catalyst supported by said filter, and said nitrogen oxides are reduced by said particulate matter serving as a reducing agent.

2. The method of cleaning an exhaust gas according to claim 1 wherein said particulate matter is oxidized at a temperature of 400° C. or lower.

3. A method of cleaning an exhaust gas containing nitrogen oxides and particulate matter by using an exhaust gas cleaner comprising a heat-resistant, porous filter and a catalytic layer formed on said filter, said catalytic layer being a uniform mixture of a catalyst and a ceramic carrier powder, said catalyst consisting essentially of:

(a) 10 to 50 parts by weight of at least one alkali metal element;

(b) 30 to 80 parts by weight of copper and vanadium wherein the ratio of copper to vanadium is 5:1 to 1:15; and (c) 10 to 50 parts by weight of at least one rare earth element, wherein the amount of said catalyst is 1 to 20 parts by weight and the amount of said ceramic powder is 1 to 10 parts by weight, based on 100 parts by weight of said filter, and wherein said particulate matter is oxidized by said catalyst supported by said filter, and said nitrogen oxides are reduced by said particulate matter serving as a reducing agent.

4. The method of cleaning an exhaust gas according to claim 3 wherein said particulate matter is oxidized at a temperature of 400° C. or lower.

* * * * *